United States Patent [19]
Bresnick

[11] 3,980,929
[45] Sept. 14, 1976

[54] CORONA CURRENT INTERRUPTER
[75] Inventor: Herbert L. Bresnick, Rochester, N.Y.
[73] Assignee: Xerox Corporation, Stamford, Conn.
[22] Filed: July 7, 1975
[21] Appl. No.: 593,914

[52] U.S. Cl. .............................. 317/16; 317/18 R; 317/50
[51] Int. Cl.² ........................................ H02H 3/08
[58] Field of Search ................ 317/3, 4, 16, 18, 20, 317/33 UR, 50, 262 A; 250/324–326

[56] References Cited
UNITED STATES PATENTS

| | | | |
|---|---|---|---|
| 3,309,575 | 3/1967 | Lee et al. | 317/50 X |
| 3,526,811 | 9/1970 | Shrader | 317/16 |
| 3,584,258 | 6/1971 | Barnett | 317/18 R |
| 3,609,484 | 9/1971 | Sakamaki | 317/262 A |
| 3,805,069 | 4/1974 | Fisher | 317/262 A X |

Primary Examiner—Harry Moose

[57] ABSTRACT

In an electrostatographic copier in which an imaging surface is corona charged by high voltage biased electrodes, particularly those in which corona wires overly a reusable photoreceptor, protection of the imaging surface from arcing from the corona electrodes, particularly in the case of corona wire breakage, is provided by automatic rapid interruption of the high voltage to the electrodes, by electrically detecting a sudden change in the current to the electrode. This detection is accomplished at low voltage levels, yet with appropriate circuitry the high voltage can be rapidly switched off or shorted to ground. Simple, low cost exemplary circuits using high speed relays or gas discharge tubes controlled by current change detectors are disclosed. Detection of sudden changes in the true electrode-to-imaging surface current, independent of changes in electrode-to-shield currents is provided.

15 Claims, 3 Drawing Figures

CORONA CURRENT INTERRUPTER

The present invention relates to the protection of imaging surfaces in electrostatography from high voltage circuitry associated therewith, and more particularly high speed electrical circuit interrupters automatically responsive to a change in electrical condition of corona generators acting on the imaging surfaces.

Subject matter partially in common is disclosed in U.S. application Ser. No. 572,683, filed Apr. 28, 1975, by Thomas B. Michaels and George H. Place, Jr., entitled, "Electrostatographic Diagnostics System" [D/74134], which is commonly assigned.

In electrostatographic copying, particularly xerography, it is conventional to use several different high voltage biased corona generators for applying different electrostatic charges to an imaging surface. These charges are generally applied for several different and/or simultaneous functions on a single imaging surface. Examples are corona generators utilized for: initial charging of a photoreceptor, pre-transfer, transfer, sheet detack, pre-cleaning, etc..

Many of these corona generators in electrostatography utilize a conductive shield partially surrounding a long, small diameter, high voltage biased corona generating electrode wire, as in a corotron, which wire is supported only at its two opposite ends, and which connects to its high voltage power supply at only one end. U.S. Pat. No. 2,836,725, issued May 27, 1958, to R. G. Vyverberg is noted. Biased conductive control wire screens may also be imposed between the corona generating electrode elements and the surface to be charged, as in a scorotron. U.S. Pat. No. 2,777,957, issued Jan. 15, 1957, to L. E. Walkup is noted. Various input current sensing and output level control arrangements are known for corona generators, and some examples are listed herein. It is known to terminate corona charging in response to a measured charge having been deposited on an imaging surface.

It is well known that corona generator wires are often subject to breakage during machine operation for various reasons including toner contamination. It is known that as the broken wire falls toward the imaging surface that sparking or arcing can rapidly occur therebetween which will damage the reusable imaging surface and require its replacement. Arcing or sparking from a corona electrode to its shield or to the photoreceptor or other grounded machine element can also suddenly occur due to causes other than wire breakage, such as a build-up of contaminants. Such arcing or sparking, unless very rapidly interrupted, can contribute to corona wire breakage or cause other damage or maintenance problems.

The use of mechanical spring shorting arrangements directly in the corona unit itself and closed by the breakage of the corona wire has been suggested, e.g., U.S. Pat. No. 3,609,484, issued Sept. 28, 1971, to Hisashi Sakamaki, et al. However, a mechanical switch which would be directly subjected to toner contamination and which would have substantial mechanical inertial time delays has obvious disadvantages, since a corona current interrupting switch will operate only infrequently, if ever, yet must be able to remove the high voltage from the corona wire within a very brief time period, e.g., before the broken wire end moves by gravity or by a tension whip-lash action into proximity with the imaging surface (which it is normally closely spaced from). Thus, a very fast acting, reliable and non-contaminating current interruption circuit is desired. The potential arcing conditions may require current interruption which is faster than the response time for shut down of a conventional high voltage power supply. Further, it is appreciated that the rapid interruption of high voltage circuits is difficult to accomplish with compact and inexpensive circuitry. Conventional transistor switching circuits are not usable for directly switching off voltages of, for example, 5000 to 12,000 volts, such as are commonly utilized for corona generators in electrostatographic copying systems. Yet it is desired that the protective circuit be simple, compact, and inexpensive so that various or all of the corona generators, especially those above (overlying) the imaging surface, can be protected for less than the replacement cost of the imaging surface. The present invention is intended to provide these advantages.

The shield which is generally located closely adjacent the corona generating electrode element usually draws charges from the corona generating element and conducts away a substantial (if not major) portion of the total output current generated by that corona electrode. That is, the shield subtracts a substantial portion of the total corona generator input current. The functional or useful output is only that portion of the corona charge output current escaping the shield and flowing to the imaging surface being charged.

It is known that the conductive shield and/or screen of a corona generator can be electrically connected back to a part of the power supply and/or used as part of a corona power supply output control, e.g., U.S. Pat. No. 3,699,388, issued Oct. 19, 1972, to T. Ukai, noting especially Col. 3, lines 22-32. Sensing electrodes controlling a corona generator are taught in this 3,699,388 patent, and in U.S. Pats. Nos. 3,604,925, issued Sept. 14, 1971, to C. Snelling, and 3,819,942, issued June 25, 1974, to P. Hastwell, et al.

Particularly noted here are the corona generator control circuits of U.S. Pats. Nos. 3,062,956, to J. Codichini, Nov. 6, 1962; 2,868,989, to A. C. Haacke, Jan. 13, 1959; 3,244,083, to R. Gundlach, Apr. 5, 1966; 3,557,368, to T. Tano, Jan. 19, 1971; 3,769,506, to M. Silverberg, Oct. 30, 1973; and 3,805,069, to D. H. Fisher, Apr. 16, 1974.

The above-cited application Ser. No. 572,683, teaches circuitry, also disclosed hereinbelow, for the accurate measurement and control of the actual output currents of the individual corona generators in a copying apparatus under dynamic operating conditions. That is, the actual output current of a given corona generator can be measured while the copying apparatus is operating normally with other corona generators also applying their charges to the imaging surface, to a copying sheet thereon, etc. Further, with that system the imaging surface and its substrate can be conventionally grounded. Basically, in that charging current measurement system the portion of each corona generator current going to its conductive shield is subtracted from the total input current supplied to that corona generator to provide a measurement of the current actually going from the corona generator to the imaging surface or plate. This is based on the principle that the total input current supplied to the corona generator must go to either the imaging surface or the shield, and that is the shield current is electrically floated slightly above ground it can be fed back and subtracted to achieve the measurement of the true plate (imaging surface) current, and therefore the current applied charge. This measurement of the true charging current can then be utilized for maintaining the true dynamic charging current constant by changing the corona generator input current. That measurement may also be utilized for various other diagnostic or control purposes.

As will be further described herein, the present invention is particularly suitable for incorporation with such a corona current measurement system, although not necessarily limited thereto. The protection system disclosed herein may be utilized with various types of corona generators, power supplies, imaging surfaces and xerographic or other electrostatographic systems. Details of various suitable exemplary such systems and structures and their functions and materials are well known to those skilled in the art, and the references referred to in this specification may be incorporated by reference, where appropriate, if desired, for such details.

Further objects, features and advantages of the present invention pertain to the particular apparatus and details whereby the above-mentioned aspects of the invention are attained. Accordingly, the invention will be better understood by reference to the following description of examples thereof, and to the drawings forming a part of the description, wherein.

Figure 1:
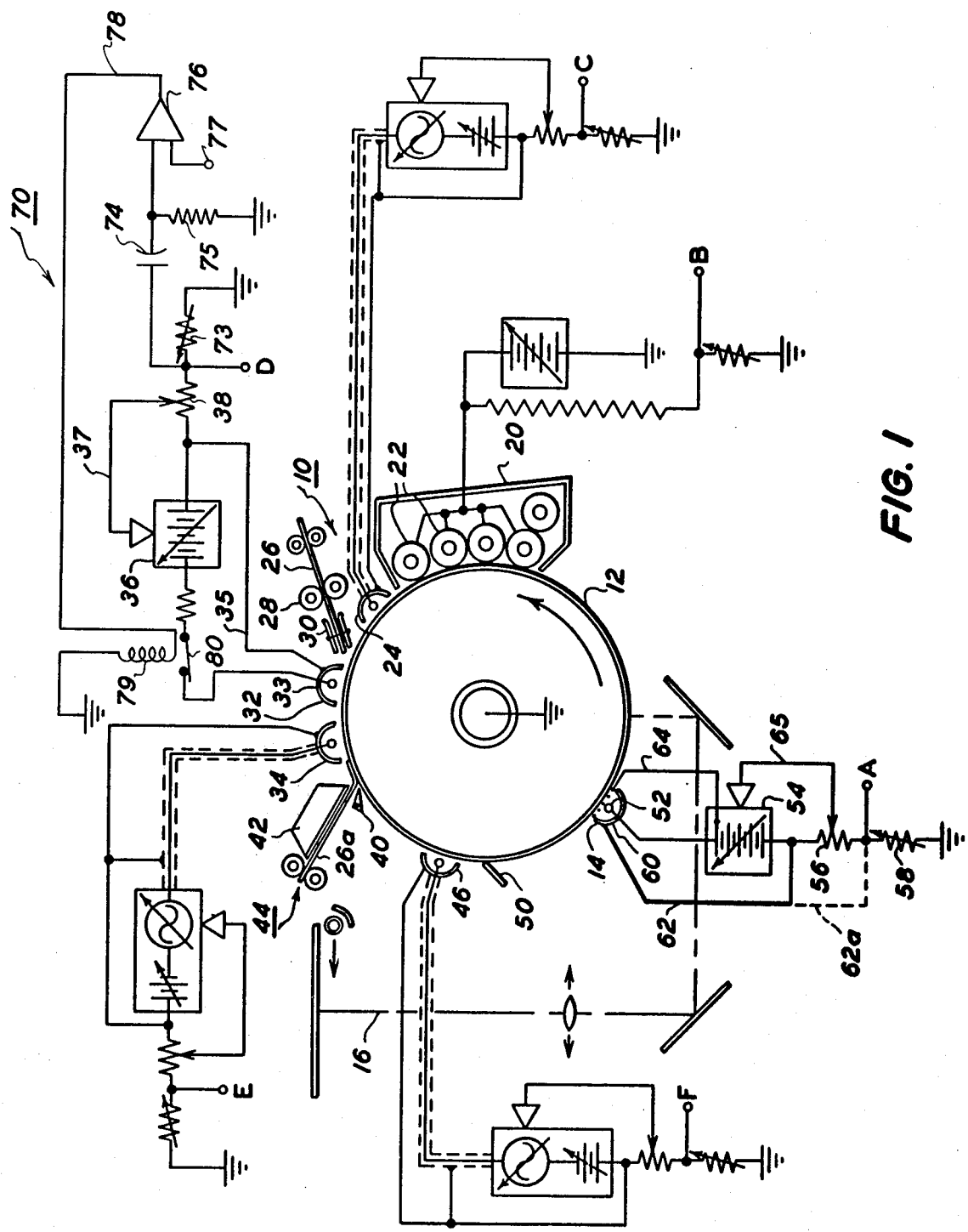
FIG. 1 is a schematic view of an exemplary electrostatographic copying system incorporating a corona charge generator photoreceptor protective control system in accordance with the present invention.
Figure 2:
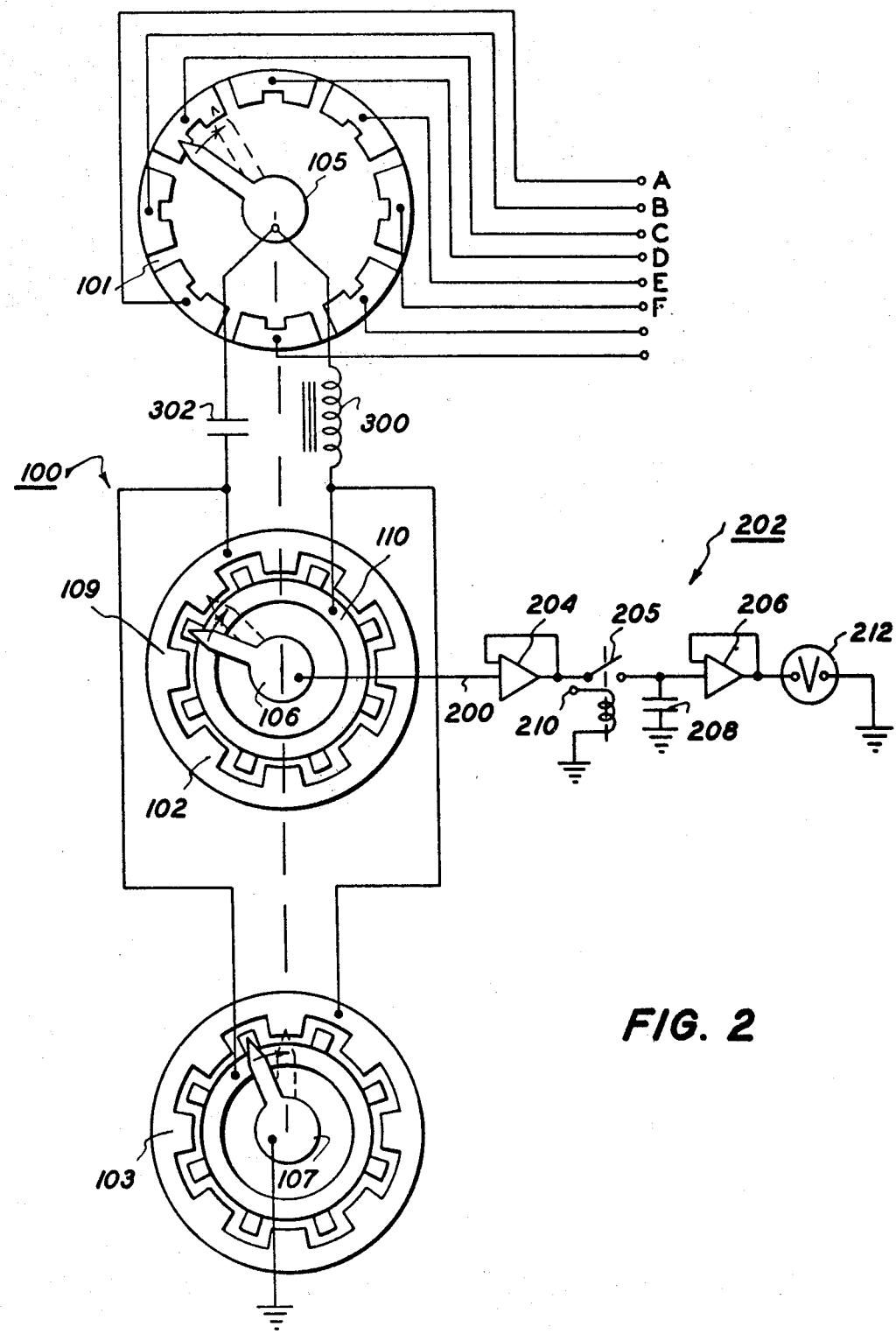
FIG. 2 is a related schematic view of exemplary circuitry connecting with the circuitry of FIG. 1 for switching and measurement of corona generator current signals.

Referring first to the embodiment of FIGS. 1 and 2, there is shown in FIG. 1, an exemplary electrostatographic copying system 10 in which images are formed and developed on, and then transferred from, a photoconductive surface 12. This imaging surface 12 is shown being acted upon (charged or discharged by) various controlled corona generating devices, as will be described further herein. The general configuration, number and type of these corona generating elements per se and the xerographic arrangements may all be conventional. For clarity, only one exemplary protective circuitry 70 is shown in FIG. 1, associated only with only one corona generator 32. It will be appreciated that the protective circuit 70 of FIG. 1 and the protective circuit 300 of FIG. 3, could be used with any or all of the corona generators of FIG. 1.

First briefly describing in sequence the schematically illustrated conventional operating stations of the xerographic system 10 in FIG. 1, the imaging surface 12 is uniformly initially charged by a charging scorotron 14. A latent image is then next formed on the imaging surface 12 by optically exposing the imaging surface 12 through an optical document scanning system 16 which selectively discharges the imaging surface 12 in the document image pattern. See, e.g., U.S. Pat. No. 3,775,008. The electrostatic latent image on the imaging surface 12 is then conventionally developed here with particulate toner material in a magnetic brush development station 20 containing a plurality of rotating magnetic developer rollers 22. These developer rolls 22 are electrically biased to produce an electrical field between themselves and the imaging surface 12, rather than a corona charge output.

The imaging surface 12 is next subjected here to A.C. (with a D.C. bias) corona emissions from a pre-transfer corona generator 24. The developed and pre-treated toner image is then carried on the imaging surface 12 into the transfer station, where it is overlaid with a copy sheet 26 fed into registration with the toner image by conventional copy sheet feed means 28 through sheet guide members 30. The opposite side of the copy sheet 26 from the side in engagement with the imaging surface 12 is subjected to transfer charges by a D.C. transfer corona generator 32 to effect image transfer to the copy sheet of the toner particles. Then, for stripping of the copy sheet from the imaging surface, the copy sheet is subjected, immediately downstream from the transfer corona generator 32 to an A.C. (possibly D.C. biased) detacking corona generator 34.

Mechanical back-up stripping of the copy sheets is illustrated here by a second copy sheet 26a being stripped from the imaging surface 12 by a stripper finger 40. The copy sheet 26a is shown slidably supported by a vacuum shoe 42 for guiding the copy sheet 26a into the nip of a pair of rollers forming the image fusing station 44. (See, e.g., U.S. Pat. No. 3,578,859, issued May 18, 1971, to W. K. Stillings.)

Finally, the imaging surface 12 is subjected to A.C. corona emissions from a pre-clean corona generator 46 prior to the residual toner being removed therefrom by a conventional cleaning blade 50, or cleaning brush.

The corona generator current measurement and power supply control systems of the above-cited copending application by T. B. Michaels and G. H. Place, Jr., will now be described. As may be seen from FIG. 1, electrically independent power supplies are provided here for each of the above-described corona generators. Each corona generator power supply here is electrically isolated from one another and is also isolated from ground. However, each power supply has one terminal connected to ground through a current measurement resistance circuit as will be further described herein. These respective variable D.C., or variable A.C. with variable D.C. bias, power supplies are all illustrated schematically here since such circuits are well known.

It will be appreciated that various components of these illustrated power supplies can be shared, in whole or in part, between the various corona generators, as long as the currents from electrical ground can be measured individually for the individual corona generators. For example, common transformers can be utilized with separate secondary windings providing the electrical input to the discrete power supplies. Note, for example, U.S. Pat. No. 3,275,837, to J. J. Codichini et al. issued Sept. 27, 1966.

It will also be appreciated that although individually shielded corona generators are illustrated here that it is well known that jointly or commonly shielded corona generators may be utilized in certain situations. It is also well known that the term corona generator includes multiple wire or needle array corona generating elements as well as the single wire corona generators illustrated here.

Each of the corona generator conductive shields here in FIG. 1 is individually electrically isolated from one another and also isolated from both the imaging surface 12 and from electrical ground. Instead, each corona generator shield is connected by an individual feedback circuit only to the respective individual power supply for that individual corona generator. Thus, this shield current feedback circuit is electrically isolated from both the imaging surface and from electrical ground. This feedback circuit feeds the shield current directly back to the corona generator power supply.

As noted above, this shield current is the variable portion of the input current to the corona generator electrode which flows to the shield of that corona generator rather than to the imaging surface. Feeding back this shield current contrasts with conventional xerographic systems in which most of the corona generator shields are generally electrically grounded. Here, the shield currents are returned to the electrical ground or "low" side of their power supplies, i.e., the shields are at a low voltage potential. However, the ground side of each power supply here is slightly above ground for measurement purposes, connecting with ground only through a measurement resistance circuit. This resistance circuit provides a voltage drop across its resistance which is a direct function of the current passing between that power supply and electrical ground. This ground path current here is a measure of the actual output current of the corona generator to the imaging surface 12. This is because all of the corona generator to imaging surface current (known as "plate current") can return to each power supply ground terminal only through the current measurement circuit provided by this resistive ground path. This is because of the electrically "floating" isolation of each power supply above ground. Significantly, the shield current of each corona generator does not return through this ground path, because it has a separate current loop or return path to the power supply itself, above the current measurement circuit.

To restate the above description, each corona generator here has two separate current loops. One current loop is from the high voltage side or terminal of each individual power supply to its connecting corona electrode, thence (through air ionization) to the shield of that corona generator, and thence through a feedback circuit back to the low side of the same power supply, as previously described. The other, and separate, current loop is from the same high side of the power supply to the same corona generator electrode and thence (through air ionization) to the imaging surface 12 (the xerographic plate) and thence, through the grounded substrate of the imaging surface 12, to the machine electrical ground, and then through that ground and up through the resistive current measurement circuit to the low side of the same power supply. The current measurement circuit (to be described subsequently herein) is located only in this second above-described current loop. It may be seen that all of the output current from the corona generator electrode to the imaging surface, but none of the shield current, is passed through the current measurement circuit in this second current loop.

The imaging surface 12 here in conventionally, and desirably, grounded by having a grounded electrically conductive substrate directly connected to the machine frame electrical ground. The imaging surface 12 can comprise a conventional thin integral overlay of photoconductive material on this electrically grounded substrate. Thus, all of the charges conducted off of the imaging surface 12 are conducted directly to ground through this substrate. Thus, all of the plate currents from the various corona generators are commingled together indistinguishably in this common ground path through the conductive substrate of the imaging surface and machine ground. However, with the disclosed circuitry, these commingled currents are separated for discrete measurement in the individual returns to the individual power supplies. Thus, unlike the above-described prior art in which current is measured between an electrically floating drum and ground, here any or all of the corona generators can be operating simultaneously and yet their individual plate currents can be separately measured.

Although the corona generator shields here are not connected to ground directly, they are nevertheless maintained essentially at ground potential. They can have a voltage level only very slightly above ground corresponding to the small voltage drop through the current measuring resistor in the power supply ground path. This voltage corresponds to the corona electrode plate current times this resistance value. Thus, there is no safety hazard to the machine operator from contact with the shields. Likewise, there is no increased danger of arcing from the shield to the photoreceptor, and no significant increase in the toner attraction of the shield. It will be appreciated, of course, that the shield may be intentionally biased above ground level for other reasons in some cases, such as to control the corona generator output.

Referring now to an individual exemplary corona generator control circuit, the charging scorotron 14 circuit will be discussed as an example. It may be seen that its corona emitting electrode 52 is directly connected by an electrical lead only to the high voltage side of a variable D.C. power supply 54. The low voltage side of the power supply 54 connects to electrical ground only through a resistance circuit comprising resistors 56 and 58 in series. Both of these resistors have low resistance values. They provide a small, but measureable, voltage drop thereacross from the corona generator plate current applied therethrough. It may be seen that the shield 60 of the corona generator 14 is connected by a lead 62 only to the same low side of the power supply 54, and is isolated above ground above the resistors 56 and 58.

This feedback circuit 62 for all of the shield current provides a first current loop through the power supply 54 for the shield current, as described above. Only the shield current can make a complete current loop through the lead 62. The actual current output of the corona generator 14 from the corona electrode 52 to the imaging surface 12 must return via the grounded substrate of the imaging surface to complete a second circuit from the high voltage side of the power supply 54 to its low voltage side. The only return path which is provided for this actual plate current here is through the resistive return path to the low side of the power supply 54 comprising the resistors 56 and 58, since that is the only ground connection of the power supply 54. Thus, all of the actual output current of the individual corona generator 14 is in this second and separate current loop and must pass through both the resistors 56 and 58. Further, no other corona generator current loops can be completed in the same current loop since they are from separate power supplies. Thus, the true output current of the corona generator 14, independently of its shield current, and independently of the other corona generators, can be measured at a reference tap A across the resistor 58. The voltage at point A relative to ground is equal to the actual output current to the imaging surface 12 of the corona generator 14 times the resistance of the resistor 58. This resistor 58 here is adjustable to allow for initial calibration and/or scale setting.

Because the exemplary corona generator 14 here is illustrated as a scorotron, unlike the other corona generators here it has an additional lead 64 providing a bias connection from the power supply 54 to the screen or grid wires of the scorotron. However, since these screen wires are non-corona generating in themselves, any current in the lead 64 can be only that received from the corona generating electrode 52. The lead 64 feeds back all screen current to the power supply 54 in a separate current loop not affecting the output current return path through the resistor 58.

The above-described circuitry provides the desired independent and accurate measurement of the true output of the corona generator 14. However, it may be seen that an additional resistance 56 and additional feedback lead 65 are also disclosed here. The feedback lead 65 connects at one end to a variable tap output from the resistor 56 and connects at the other end into the power supply 54 through a conventional control amplifier. This additional circuitry comprises a feedback circuit for automatically regulating and controlling the power supply 54 output. I.e., this feedback control circuit can regulate a selected pre-set output of the power supply 54 to the corona generator electrode 52, and thereby maintain a selected pre-set output current from the corona generator 14. This control circuit is responsive to changes only in the actual output current of the corona generator 14, irrespective of changes in the shield current, since the resistances 56 and 58 provide the only feedback control voltage signal, and this voltage drop only changes with the corona generator's actual output current. It will be appreciated that the separate feedback control resistor 56 here is not required and that the feedback lead 65 could be connected to the same point A, and thus be responsive to the voltage only acorss the resistor 58 instead. However, by providing an additional variably tapped resistor 56, a separate sensitivity control and/or pre-set initial output level control can be provided. It will be appreciated, of course, that both the feedback circuit 65 and resistor 56 can be eliminated entirely if purely manual conventional control of the power supply 54 is desired. In that case, of course, the high end of the resistor 58 and the reference point A would be connected directly to the low (ground) side of the power supply 54.

Referring now to the other and independent power supplies and output measurement and control circuits of the other corona generators, it may be seen that they are for the most part basically similar, and the above description for the corona generator 14 can be basically applied to them. Their current measurement taps are respectively designated here as B, C, D, E, and F. However, B does not provide a corona current measurement. It is a bias voltage measurement point. As noted above, these other corona generators do not have scorotron grid control wires and, therefore, do not have anything corresponding to the return lead 64.

The A.C. corona generators here are the pre-transfer corona generator 24, the detack corona generator 34, and the pre-clean corona generator 46. These have output taps C, E, and F, respectively. All of these A.C. corona generators here have electrically shielded leads connecting between the individual A.C. power supplies and their corona emitting electrodes to avoid A.C. current loss from the leads. The conductive shields of each lead are connected back in the same feedback return path as the corona generator shield currents. They may be commonly electrically connected to their corona generator shields. All of the alternating current loss from the leads is captured by the surrounding conductive shields for these leads and returned directly, to the low side of the respective power supplies, i.e., these lead shields are electrically isolated from ground, like the corona generator shield current path 62 previously described, to provide a current loop for these currents separate from the corona generator output.

It will be appreciated that the A.C. corona generators here may be of a type in which a dielectric shield is provided between the corona generating electrode and the conductive portion of the corona generator shield, as disclosed, for example, in U.S. Pat. No. 3,742,237, issued June 26, 1973, to D. G. Parker. It will also be appreciated that the A.C. corona generators may be of a type in which the corona shield is purely dielectric and there is no corona shield current at all and, therefore, no return current loop to the power supply. In that case, however, there would still preferably be a return current path for the conductive shielding of the electrical lead of the power supply to the corona generator.

To summarize, all high voltage A.C. cable losses are preferably individually collected by shields and returned to their respective power supplies for all A.C. corotrons. Otherwise, if A.C. currents from a power supply lead could escape to machine ground, it would return to the low side of the power supply through the current measurement loop (i.e., the resistive path between the low side of the power supply and ground). This would erroneously add to the measured output current of the A.C. corona generator.

Another embodiment (not illustrated) in lieu of transfer corotron 32 could be a bias transfer roller system, such as that disclosed in the above-cited U.S. Pat. No. 3,860,436. This is another example of a system in which a biased electrode means is applying a transfer field bias to the imaging surface, and in which it is desired to be able to selectively connect that biased electrode to the same current measurement circuit to measure its corona current to the imaging surface, and in which arcing conditions to the photoreceptor might occur under some failure conditions. The respective bias supply can be similarly controlled by measurement of its power-supply-to-ground current at a low voltage level rather than by having to measure its bias output current at its high voltage level (e.g., at the output of its power supply).

Considering now the disclosed exemplary embodiment of FIG. 1 of the present improvement in this above-described exemplary corona current measurement system, the transfer corotron 32 and its associated power supply 36 and measurement circuit here will be described as exemplary of one such corona generator circuit incorporating the exemplary protective high voltage interruptive circuit 70. It may be seen that the transfer power supply 36 and its current measurement and control circuit connections are essentially the same as that previously described for the charging corona generator 14. The feedback circuit 35 is an equivalent of the feedback circuit 62 of the corona generator 14, i.e., it is by-passing all the shield 33 current back to the low voltage side of the power supply 36 in a different current loop than that of the current measurement circuit through resistor 73 providing the output at point D. The shield 32 voltage thus always remains substantially at ground potential. Its voltage level corresponds only to the transfer corona generator 32 plate current times the measurement path resistance to ground. That resistance is provided by the power supply control resistor 38 and the output measurement resistor 73 in series, corresponding to the resistors 56 and 58, and can be less than 10,000 ohms. That is many times less than the impedance of the corotron 32 itself, i.e., the impedance between the corona generating electrode and its shield or the imaging surface. The output at D, across only measurement resistor 73, has an even lower level. Maintaining the voltage level of all of the shield and measurement components at substantially ground potential has important advantages, as previously noted. The excess corona current protection arrangements 70 and 300 disclosed herein are improvements in combination with the basic corona generator measurement and control scheme disclosed above and in the above-identified Ser. No. 572,683 which improvement is fully integrally compatible with such measurement and control and provides additional novel functions.

Referring now to the details of the exemplary protective circuit 70 of FIG. 1, its input signal is derived from the existing measurement point D of the above-described corona output measurement circuitry. This input signal is taken through a capacitor 74 connected to tap D and a resistor 75 connecting between the other side of the capacitor 74 and ground. The capacitor 74 and the resistor 75 provide a conventional differentiating circuit for differentiating changes in level at point D which is connected to one input level of a conventional low voltage transistor amplifier 76.

The other input lead 77 to the amplifier 76 can be connected to a pre-set threshold reference voltage so as to suppress the output of the amplifier 76 unless the input signals through the capacitor 74 are of a desired magnitude. This input 77 can also be provided with an inhibit signal during certain machine conditions as will be described later.

It will be appreciated that this differentiating circuit at the input to amplifier 76 operates in a conventional manner to pass therethrough as a pulse any fast (transient) changes in the level of the voltage at point D, of either polarity. Such pulses are fed to the input of the amplifier 76, whereas slowly occurring changes in the voltage level at D are blocked. Thus, changes in corona output due to ambient condition changes, etc., do not provide an input signal. The amplifier 76, may, if desired, include conventional latching or predetermined output pulse length circuitry to latch or increase the pulse width of the output at lead 78. It will also be appreciated that when the circuit 70 is connected to a current measurement point of an A.C., rather than D.C., corona generator that this input circuitry may include a simple diode rectifier bridge, if desired.

This input or trigger circuit portion of the circuit 70 operates to detect any sudden changes in the output of the corona generator and to provide an output signal on lead 78 instantaneously in response thereto. It will be appreciated that these detected sudden changes in the corona current will be blocked by connection to existing machine logic or internal delays for brief time periods during the initial start-up and shut-down of the machine, i.e., during the time period in which the power supply 36 is being initially turned on or shut off during the normal operation of the machine. This can be provided, as noted here by an inhibit signal at the amplifier 76 input lead 77, or by various other known arrangements.

It may be seen that the output lead 78 in circuit 70 provides the operating (switching) current to the coil 79 of a magnetic relay 80 here. The relay 80 is normally closed and normally provides the connection between the high voltage output of the power supply 36 and the corona electrode of the corona generator 32. A resistance is shown here in this output path from the power supply 36 to the switch 80 to indicate the desired high impedance nature of this power supply. It is desired that the power supply 36 conventionally have a pre-set maximum short circuit output current so as to limit the maximum contact current against which the switch 80 must open.

With the above-described simple circuit arrangement 70 that any major rapid change, of either polarity, in the actual output or plate current of the corona generator 32 will cause the high voltage output of the power supply 36 to be automatically rapidly interrupted by the opening of the switch 80. All voltage and current will then be removed from the corona electrode much faster than a broken electrode wire could fall into proximity to the photoreceptor 12 and damage it by arcing.

The switch 80 must be a high speed switch capable of rapidly interrupting the high voltage output of the power supply 36, which may be typically 8,000 to 12,000 volts. Small magnetic relays have been previously used in xerographic high voltage power supplies to short residual high voltage charges in the power supply capacitors after the power supply is shut down. Such relays are desirable in this application not only from the standpoint of high speed operation, but also because they are sealed and inert gas filled, and therefore not subject to contamination by toner or other contaminants. As example of a suitable magnetic reed relay switch 80 is a commercially available model W102VX-55, with form B contacts, from Magnecraft Corporation of Chicago, Illinois. Such a relay can be operated with a low coil voltage, e.g., 24 volts D.C., and yet its contacts can open to interrupt a voltage of 10,000 to 12,000 volts D.C. under a load of more than 100 microamperes with a switch operating time of 1 milisecond or less. It is believed that this particular relay model could operate to switch off up to 1 miliampere at 10,000 volts. Further, such types of relays are available with permanent magnet arrangements to latch the contacts open or closed, as desired. Thus, the switch 80 can be made to latch open and require a "reset" pulse, if desired.

Switching in 1 milisecond or less is highly desirable, since it has been calculated that a broken charged corona wire can fall against the photoreceptor in a time period not substantially greater than this.

It will be appreciated that the level of the current passing through the switch 80 contacts which must be rapidly interrupted (upon the receipt of a fault signal corresponding to a sudden change in the corona output) will depend on the particular fault. If the sudden current change is due to the wire breaking near its power supply connection end then the corona output current would suddenly decrease to nearly 0. This would be detected at point D at the circuit 70 and the switch 80 would immediately open under effectively "no load" conditions. If, however, the corona wire breaks at the opposite (far) end from its power supply connection, so that the whole wire remains ion generating, then the output current will increase from its normal operating level to a higher output level as the broken wire moves closer to the photoreceptor. This sudden increase in output current would also be detected by the circuit 70 and the switch 80 would be open in the same manner. However, in this case, or in the case of arcing for reasons other than wire breakage, such as contamination, the output current of the corona generator will be rising toward the limiting current output of the power supply 36, and the switch 80 must then interrupt a current which is higher than the normal corona current, e.g., 100 microamps or more.

It will be appreciated that once the switch 80 has opened to substantially instantaneously remove the high voltage from the corona electrode, that this same switching signal in the lead 78 may be connected to existing machine logic to initiate a machine shut down and turn off the power supplies. (ALso, if desired, a suitable diagnostics display may be actuated to indicate the fault condition). In this case the relay 80 would only have to be operated for a sufficient time for the power supply 36 output voltage to drop to a low level, typically several milliseconds to several seconds depending on the particular power supply circuitry.

It will be appreciated, of course, that the relay 80 would desirably be located as an integral part of the power supply or its control circuitry. As previously noted, this is greatly preferable to an arrangement in which a current interrupting switch must be located in the corona generator itself.

Figure 3:
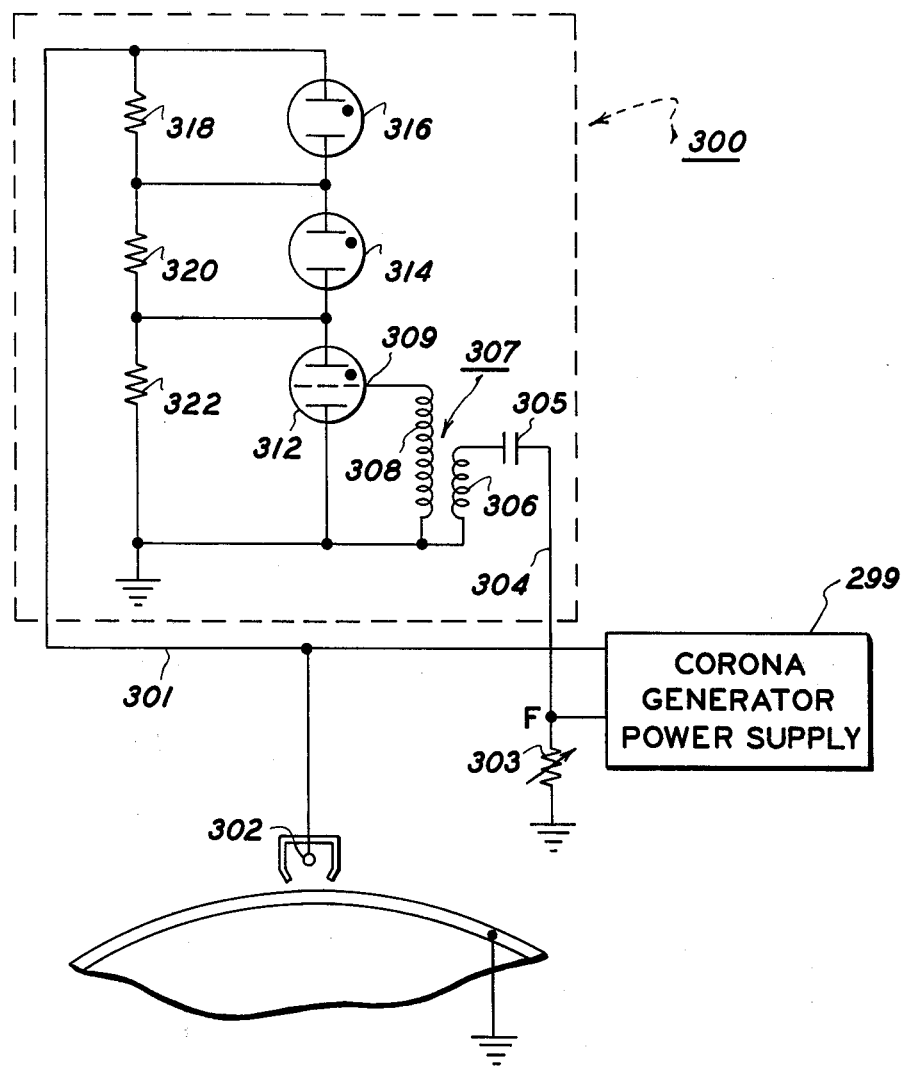
FIG. 3 is a schematic view of an alternative embodiment of another exemplary corona generator power supply automatic interruptor circuit of FIG. 1.

Referring now to FIG. 3, there will be described the alternative protective circuitry 300 embodiment. The circuit 300 differs somewhat in function as well as structure. It operates by almost instantaneously shorting the high voltage output of the corona generator power supply to ground, rather than opening the circuit, when a fault condition (sudden change in corona current) is detected. This relies, of course, on the corona generator power supply being of a conventional self-limiting (self-protecting) type, i.e., the power supply has sufficient internal impedance to limit the maximum (short circuit) high voltage output current to a level which will not damage the power supply, overload the protective shorting circuitry 300, or cause other problems.

It may be seen in FIG. 3 that the high voltage output lead 301 from the high voltage supply 299 connects directly to both the xerographic corona electrode 302 and the high voltage side (top) of the protective circuit 300, i.e., they are in parallel. The ground lead of the power supply 299 connects to ground through a measurement resistance 203 as in the circuitry previously described. This provides a low voltage signal at point F directly proportional to the actual output of the corona generator 302. Connecting between point F and the circuit 300 is a low voltage lead 304 conducting the trigger or operating signal for the circuit 300 from point F. This provides the advantages noted above (for the circuit 70) of the entire trigger circuit, including the interconnecting wire, being able to operate at a low voltage. An amplifier (not shown) may be connected in the lead 304 in the same manner as for the circuit 70, if desired.

Here the lead 304 connects through a capacitor 305 to the primary winding 306 of an inexpensive high voltage pulse transformer 307. The secondary winding 308 of the pulse transformer 307 has a much greater number of turns and thus provides substantial voltage amplification of the current pulse in the primary winding 306 received from point F through capacitor 305. The high voltage output of the secondary coil 308 connects to a trigger or grid electrode input 309 of a trigger gas filled discharge tube 312. The tube 312 can be triggered by such a brief, low current, voltage pulse substantially instantaneously and a high power input signal is not required. Thus, like the circuit 70, a sudden change in the corona electrode output current will operate to trigger the circuit 300.

The circuit 300 shorts the high voltage supply 299 to ground to reduce the voltage on the electrode 302 to a low level whenever an input trigger signal is received on the lead 304, utilizing small, inexpensive gas filled surge voltage protector tubes. Thes tubes provide, in their normal undischarged condition, an effectively infinite impedance not drawing any significant current and, therefore, not affecting the measurement of the corona output current.

The particular circuitry arrangement and number of gas discharge tubes is a matter of design choice, and will depend on the voltage level of the corona generator power supply 299 and the discharge voltage of the individual tubes. In this particular arrangement, three gas discharge tubes 312, 314, and 316 are utilized connected in series between the high voltage lead 301 and ground. In parallel with them is a voltage divider string of three resistors 318, 320, and 322. The inter-connecting points between these resistors are respectively connected, as shown, to the inter-connecting points between the tubes 316, 314, and 312. In the normal non-conducting states of these tubes the total voltage on the lead 301 is proportionally divided by these resistors 318, 320, and 322, and only the proportion of the voltage applied across each of the resistors is applied across each tube. The tubes 314 and 316 may be two electrode (nontriggerable) tubes. They are non-conducting below their avalanche potential and conducting when a sufficient voltage is applied across their two terminals to cause the tube to discharge.

Considering now the operation of the circuit 300, when the voltage pulse from the trigger circuit described above is applied at the electrode 309 of the triggerable (three element) surge voltage protector 312, this tube 312 will fire first. Its conduction will drop the voltage across itself and its parallel connecting resistor 322 from a normal high voltage to a low level (near ground) potential. Thus, the total voltage on the lead 301 is now applied across only the resistors 318 and 320. This raises the voltage across the tubes 314 and 316 by the same amount. The resistors 318 and 320 and the firing voltages of the tubes 314 and 316 are selected such that at least one of these tubes will reach its firing voltage under this increase voltage condition when tube 312 conducts. When either one of the tubes 314 and 316 fires the entire supply voltage is then applied across the remaining tube and it will also fire.

It may be seen that since there are no moving parts and relatively low capacitance in this above-described shorting circuitry. Thus, in far less than one millisecond the tubes 312, 314, and 316 all conduct to provide a direct low impedance or shorting path to ground for the high voltage output lead 301 of the power supply 299. This then directly drops the voltage level on the corona electrode 302 to a safe potential. if the gas discharge tubes are of the type providing a glow (visible output)

they can be so positioned in the apparatus to provide a visual diagnostics output, if desired, indicating the particular corona generator affected.

Some examples of appropriate gas discharge tubes would be those manufactured by Siemens Corporation, e.g., their model KA6 SVP, and KAT-05 triggerable SVP. These tubes are designed for high voltage surge protection and are capable of discharging far more current than would normally be encountered from a xerographic corona generator supply. It will be appreciated that if a single triggerable surge voltage protector of the appropriate voltage rating can be provided, that a simpler (single tube) circuitry could be utilized here instead of the three tube circuitry shown.

As previously noted, it will be appreciated that the circuitry 300 of FIG. 3 or circuitry 70 of FIG. 1 may, if desired, be combined or have elements in common between different individual corona generators. For example, a common fault detector/amplifier (triggering circuit) could be utilized using a conventional multi-input OR gate with its inputs connected to the various corona current measurement points. The trigger output could be utilized to interrupt, by opening or shorting to ground, all of the corona power supplies when a fault condition is detected on any one. Alternatively, a low voltage output switching arrangement for the trigger output signals could be provided.

While the disclosed operation of protective circuitry by a low voltage level detected signal corresponding to the actual corona output current is preferred, it will be appreciated that the protective circuitry of the invention may be operated by other input signals. For example, a high voltage capacitor can be connected to a resistance in the output lead of the power supply 36 to provide a trigger signal proportional to the total output current of the power supply, i.e., the sum of the corona current to both the plate and to the shield.

With either of the embodiments disclosed herein, it may be seen that the protective circuitry operates only with associated with the corona power supplies. No new or separate connection to the corona electrode is required. Specifically, the preferred arrangement whereby the only electrical connection to a corona wire is to only one end thereof can be retained. No electrical connection to the other end of the corona wire is required with the circuitry here in order to detect a wire break. That is desirable since it retains the simplified mounting of the corona electrode units 33 and their wiring and does not increase the high voltage wiring required.

Referring now to the disclosed switching arrangement of the above-cited copending application Ser. No. 572,683, by T. B. Michaels and G. H. Place, Jr., for selectively switching between the measurement taps A through F of FIIG. 1 to individually measure the different corona generator currents, there is disclosed in FIG. 2 exemplary circuitry therefor merely by way of example. Such circuitry is not an esential part of the present invention. It may be seen that this circuitry in FIG. 2 comprises a three deck wafer switch 100 with common shaft rotation of the individual wiper arms on each wafer deck. The three wafer decks here are designated 101, 102, and 103 and their respective wiper arms are 105, 106, and 107. The inputs of the switch 100 are leads connecting to the respective measurement points A through F, as indicated, plus any other elements inputs to be measured. The output here is through a lead 200 from wiper arm 106 to a measurement circuit 202. The switch 100 and measurement circuit 202 here are arranged to separately sample, hold, and measure the A.C. and D.C. current components of each corona generator current separately.

As noted above, with the circuitry disclosed in FIG. 1, each individual corona generator's plate current, i.e., its actual charge output, may be individually measured at its respective measurement tap even though any or all of the other corona generators are operating. The output of any individual corona generator can be measured with the machine operating in its normal operating state. These current levels measurements can be taken instantaneously, so called, by sampling and storing the instantaneous current levels in storage means such as provided in the circuit 202 here, or on an oscilloscope trace, etc.. These instantaneous current measurements are desirable for such diagnostics as observing the effects of the movement of different copy sheets through the transfer area, or observing the effect on the output of corons generators due to changes in the images being developed, etc..

With the circuitry shown here a single common current measurement circuit 202 can be utilized, rather than requiring separate current measurement devices for each corona generator. The switching arrangement 100 provides for the switching of this common current measurement circuit 202 between selected individual corona generator power supplies in their current measurement path to the imaging surface grounded substrate. It further provides means for separating and separately measuring the D.C. and A.C. components of said output current of the individual corona generators. This is accomplished here by providing an inductive filter 300 and a capacitive filter 302 and a switching arrangement for selecting therebetween for separating and separately measuring the D.C. and A.C. components of the corona generator output current. This switching arrangement for switching between the two filters 300 and 302 is here an integral part of the overall switch 100, being provided for the wafer decks 102, the wipers 106 and 107, and their connecting circuitry.

It will be appreciated that numerous other arrangements may be utilized in lieu of the switching arrangement 100 and measurement circuit 102 connecting therewith. For example, individual current meters could be placed directly between the low voltage side of each corona generator power supply and ground. That, of course, would add considerable additional expense. In that case, there would be no resistance elements, e.g., no resistors 56 and 58 in this measurement current path, other than the internal current meter resistance. Another alternative measurement system would be to provide a wafer switch connection directly with the low voltage side of each power supply, in which the switch would contain a shorting ring which would directly ground all of the power supplies except the one being measured. The one corona generator power supply being measured would be switch connected to a single common measurement resistor. I.e., one current measurement resistor would be switched between power supplies rather than being provided as a separate resistor for each individual power supply ground path as is disclosed here. The measurement function would be essentially the same since each power supply would be separated from ground by the measurement resistor while it is being measured. As previously noted, the desired value of this current measurement resistor is very low in comparison to the corona generator output impedance, so that its presence or absence in the power supply circuit would have little or no effect on the corona generator output.

The provision disclosed here of separate fixed ground path resistors for each corona generator power supply is preferred, however, since this prevents arcing or voltage build-up between the low side of any power supply and ground. With a fixed resistance in place there can be no interruption in the ground current path regardless of the condition or posiition of the switch unit selecting between the corona current measurement points. Likewise, the switch or measurement circuit are never subjected to a high voltage. In fact, all of the reference points A – D can be maintained at all times at less than 1 volt above ground, if desired.

A pre-settable fixed reference voltage source may be built into the individual power supplies or into a common reference voltage point, if desired. For measurement or power supply regulation purposes a comparison may be made between this reference voltage (rather than ground) and the current responsive voltage point A through F or the like.

It will be appreciated that a separate current measuring resistor and output tap or other current measuring arrangement may additionally be placed in the shield current feedback lead. This would provide a separate direct measurement of only the shield current if it is desired for any reason.

Referring further to the exemplary switching and common measurement circuit of FIG. 1, the output current sensing resistors in each power supply circuit (corresponding to the resistor 58 for the corona generator 14) may all be pre-set to a suitable calibrated value for measurement purposes. For measurement of the output of any particular corona generator the switch 100 is merely turned to a position selecting that desired corona generator. The switch unit 100 here is illustrated in a position connected to the output point C from the pre-transfer corona generator 24. It may be seen that switch deck 101 provides two different adjacent switch positions in which its wiper arm 105 is connected to this same output tap C. In both of these switch positions the voltage sensed at point C is applied through the capacitor 302 and inductive choke 300, which are in parallel. Exemplary values for these could be an approximately 1 microfarad or greater audio capacitor for the capacitor 302 and a conventional audio high impedance choke coil for the inductor 300. The A.C. components of the voltage present at tap C are connected via capacitor 302 to the outer contact ring 109 of the wafer deck 102. The D.C. component of the voltage at point C is passed through the inductor 300 to the inner contact ring 110 of the same wafer deck 102. The wiper 106 alternately connects in each switch position with the contact ring 109 or 110. In the illustrated solid position of the wiper 106 it is shown connecting with the inner contact ring 110. Thus, in this position the output lead 200 of the switch unit 100 is connected only to the D.C. component of the input signal received through the choke 300. In the very next position of the switch 100, shown by the dashed positions of the wipers, the output lead 200 is connected only to the A.C. component of the same input signal C through the capacitor 302.

Meanwhile, the third wafer deck 103 provides alternate connection to ground through its wiper 107 of the alternate signal component which is not being measured at the output lead 200. Its wiper 107 connects to ground and its inner and outer contact rings are connected in parallel with the rings 109 and 110, respectively, of deck 102. For example, here the wiper 107 is shown connecting the A.C. signal component from capacitor 302 to ground while the D.C. component is being measured. The opposite occurs at the next switch position.

It will be appreciated that this separation of A.C. and D.C. components for measurement may not be desirable in all cases. It will also be appreciated that it could be accomplished by different circuit arrangements, such as a double-pole, double-throw switch associated with the two filters.

Considering now the measurement circuit 202 here, this circuit illustrates a more sophisticated measurement circuit providing output isolation by means of operational amplifiers 204 and 206, and also a sample and hold function provided by these operational amplifiers together with a selectively actuable switch 205 and storage capacitor 208. The switch 205 here is shown as a relay which may be actuated from a switching signal input at 210, either manually or in response to a machine logic signals, to measure an instantaneous input voltage on the input lead 200 at any desired time. When the switch 205 is closed the input voltage is applied to and stored on the capacitor 208 at whatever level was present when the switch 205 is reopened. This voltage may then be read at leisure, due to the isolatioan provided by the second integrated circuit 206, on a conventional service voltmeter 212 or the like. It will be appreciated, of course, that this output voltage measurement may be utilized in either analogue or converted digital form for various machine control functions, as previously noted.

The sample and hold circuit here allows a measurement to be taken of the output of any selected corona generator or other biasing means at any point in the xerographic machine cycle. By using logic pulses within the existing machine logic controls, which correspond to given machine inter-cycle points or operating conditions, to intermittently pulse the switch 205 here through its relay input 210, very accurate selection of machine cycle points can be made, and comparisons can be made between the same cycle points of different machine cycles. As one example, the D.C. components of the pretransfer corona generator output being measured here can be measured at the moment the developed image lead edge passes thereunder by pulsing the switch 205 in response to the machine logic signal indicating the feeding of the copy sheet into the transfer station.

A conventional adjustable time delay circuit for delaying the actuation time of the switch 205 can be utilized in a known manner if a machine logic pulse is not available at the precise measurement moment desired. The operational amplifiers 204 and 206 can be provided here by a single commercially available dual op amp integrated circuit.

It will be appreciated that the illustrated type of sample and hold circuit of the measurement circuit 202 here is for D.C. voltage levels. Where the A.C. current component is being measured, this could, of course, be measured directly by an A.C. volt meter at the switch output lead 200. Alternatively, the integrated circuit 204 can be connected to provide rectification of the A.C. input signals to D.C. Alternatively, a conventional diode rectifier bridge can be utilized to convert the A.C. current level to a D.C. level, or active filtering circuits can be utilized.

Because the fixed connection ground path resistors 58 et al provide a low impedance and are parallel with the current measurement circuit here, the outputs of the corona generators are not affected by the switch connection interchanges or changes in the impedance of the measurement circuit. Also, it will be appreciated that these ground path resistors may be the regulator resistors already available within the power supply circuitry itself, and that the measurement circuit can be an integral part of the power supply.

It will be appreciated that with the circuitry disclosed herein, that any of the shield, output or lead currents can be measured or controlled individually or in any combination, since they are maintainable in separate or combined current paths from which measurement and/or control signals can be derived. The disclosed regulator circuitry, e.g., feedback resistor 56 and feedback path 65, can, as described, automatically maintain the actual corona generator output current constant. Thus, any corona generator can be made effectively voltage insensitive, if desired. The corona output charge will thereby not fluctuate even with changes in the charge already on the imaging surface. However, in some cases it may not be desirable to keep the output constant, and imaging surface voltage sensitivity is desired. Thus, for the charging corona generator 14 there is illustrated in dashed lines an alternative shield current feedback lead 62, a connection between resistances 56 and 58. With this alternate connection the output tap A still provides the same measurement of only the corona output through measurement resistance 58, but the regulation lead 65 now senses the sum of the output current and the shield current, since both now return to the power supply through regulator resistor 56. Thus, the power supply 54 is now regulated to maintain the sum of shield current plus output current constant rather than to maintain only the output current constant.

It may be seen that the protective circuitry of the present inventions is fully compatible with the abovedescribed switching and measurement circuitry. Unless, and until a sudden change occurs in any of the protected corona currents there is no loading or other effect on the measurement whatsoever. When a fault occurs, the measurement circuit can still provide a diagnostics fault output indication, since the particular measured corona current will indicate zero, or an abnormally high level if a shorting type protective circuit is in operation.

In conclusion, there has been disclosed herein an improved corona generator control system for electrostatographic copiers. Numerous advantages and applications, in addition to those described above, will be apparent to those skilled in the art. While the embodiments generally disclosed herein are generally considered to be preferred, numerous variations and modifications will be apparent to those skilled in the art. The following claims are intended to cover all such variations and modifications as fall within the true spirit and scope of the invention.

What is claimed is:

1. In electrostatographic copying apparatus wherein a reusable imaging surface is charged by one or more corona current emitting electrodes connected to high voltage power supplies providing high voltage corona currents to said electrodes, wherein signal means associated with the power supply provides an electrical signal in response to said corona current from the power supply, the improvement comprising:

trigger circuit means connected to said signal means for providing a trigger signal in response to an electrical signal from said signal means indicative of a rapid change in said corona current from said power supply, and fast operating high voltage interruption means operating in response to said trigger signal from said trigger circuit means for interrupting said high voltage corona current to said corona electrode from said power supply.

2. The electrostatographic copying apparatus of claim 1, wherein said trigger circuit means is responsive to either increases or decreases in said corona current.

3. The electrostatographic copying apparatus of claim 1, wherein said signal means is responsive only to the corona current emitted from a single corona current emitting electrode.

4. The electrostatographic copying apparatus of claim 1, wherein said corona current emitting electrode has a conductive shield associated therewith and emits said corona current to both said imaging surface and said conductive shield, and wherein said signal means provides an electrical signal proportional only to the corona current from said corona electrode to said imaging surface, independently of said corona current from said electrode to said conductive shield.

5. The electrostatographic copying apparatus of claim 1 wherein said signal means comprises a current measurement resistor connecting between said power supply and electrical ground.

6. The electrostatographic copying apparatus of claim 1, wherein said trigger circuit comprises a capacitance differentiating circuit connected to said signal means.

7. The electrostatographic copying apparatus of claim 1, wherein said signal means provides a low voltage electrical signal to said trigger circuit means proportional to said corona current, wherein said low voltage signal is greatly lower than said high voltage from said high voltage power supply, and wherein said trigger circuit means is activated by rapid changes in said low voltage signal.

8. The electrostatographic copying apparatus of claim 7, wherein said signal means comprises a current measurement resistor connecting between said power supply and electrical ground.

9. The electrostatographic copying apparatus of claim 8, wherein said trigger circuit means is responsive to either increases or decreases in said low voltage electrical signal from said signal means.

10. The electrostatographic copying apparatus of claim 1, wherein said high voltage interruption means comprises a high speed switch normally connecting said power supply to said corona electrode, which high speed switch is rapidly opened by said trigger signal from said trigger circuit means.

11. The electrostatographic copying apparatus of claim 10, wherein said high speed switch is a sealed magnetic reed relay switch with an operating coil connected to said trigger circuit means.

12. The electrostatographic copying apparatus of claim 10, wherein said signal means comprises a current measurement resistor connecting between said power supply and electrical ground.

13. The electrostatographic copying apparatus of claim 1, wherein said high speed switch is normally open and connects to electrical ground when it is closed.

14. The electrostatographic copying apparatus of claim 13, wherein said high speed switch comprises triggerable gas discharge tube means triggerable bay a high voltage trigger pulse, and wherein said trigger circuit means includes voltage amplification means for providing a high voltage trigger pulse signal in response to a low voltage change in said electrical signal from said signal means.

15. The electrosotatographic copying apparatus of claim 14, wherein said signal means comprises a current measurement resistor connecting between said power supply and electrical ground, and wherein said signal means provides a low voltage electrical signal to said trigger circuit means proportional to said corona current, wherein said low voltage signal is greatly lower than said high voltage from said high voltage power supply, and wherein said trigger circuit means is activated by rapid changes in said low voltage signal.

* * * * *